Nov. 24, 1970  N. D'ANDREA  3,541,895
DEVICES FOR IMPARTING RADIAL DISPLACEMENTS
TO ECCENTRICALLY ROTATING PARTS
Filed Feb. 21, 1968  5 Sheets-Sheet 1
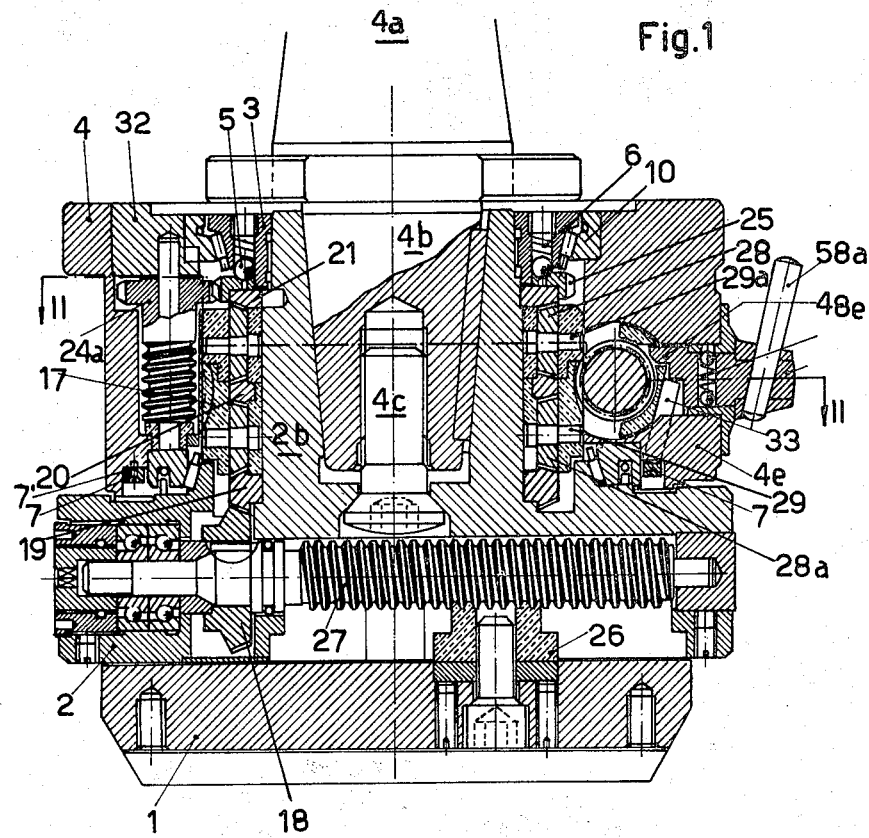
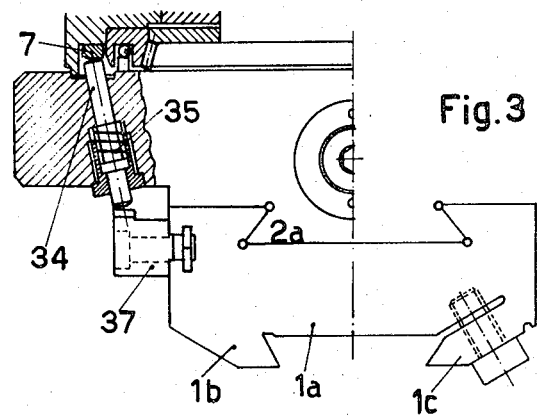
INVENTOR.
Nicola D'Andrea
BY
Richards & Geier
ATTORNEYS

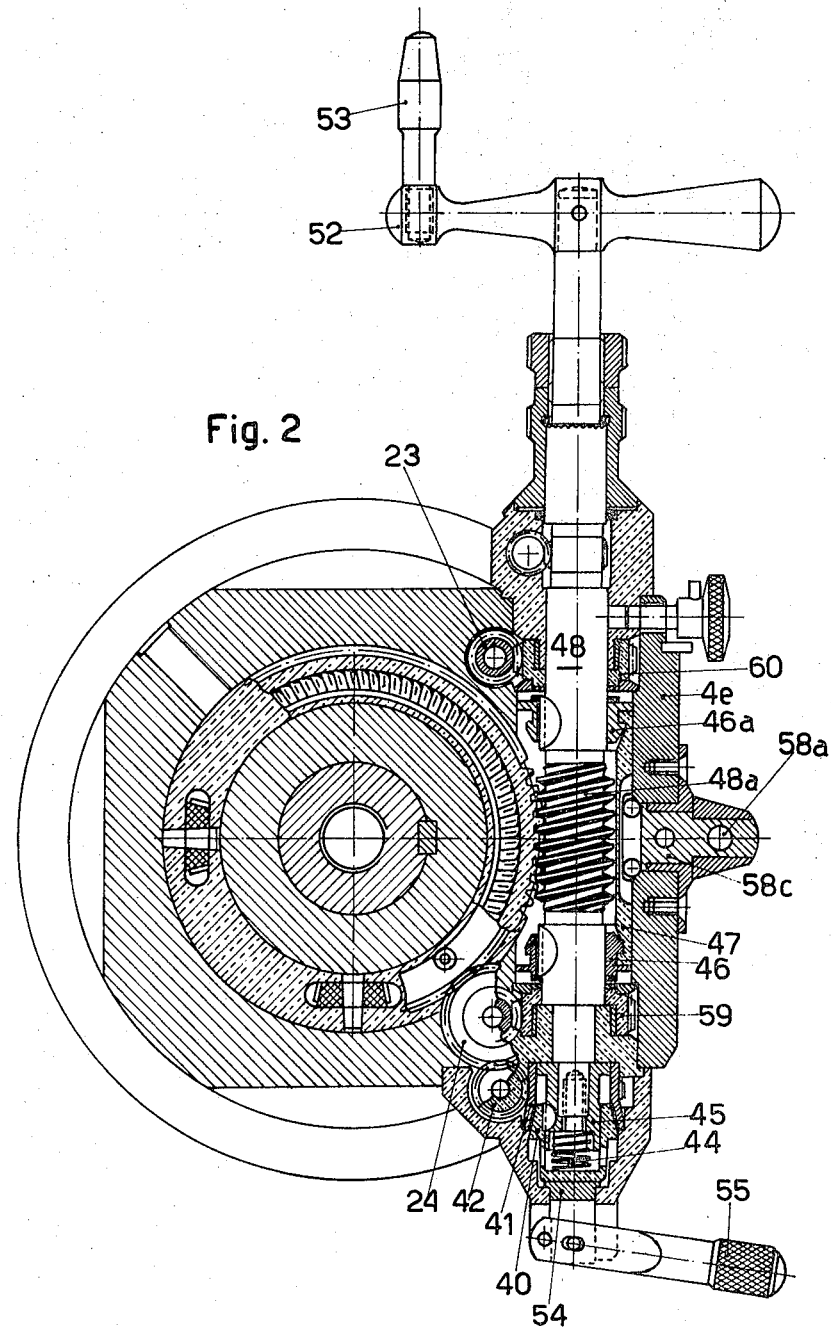

United States Patent Office 3,541,895
Patented Nov. 24, 1970

3,541,895
DEVICES FOR IMPARTING RADIAL DISPLACEMENTS TO ECCENTRICALLY ROTATING PARTS
Nicola D'Andrea, Via Luigi Cagnola 6, Milan, Italy
Filed Feb. 21, 1968, Ser. No. 707,114
Claims priority, application Italy, Feb. 27, 1967,
35,080/67, Patent 798,352
Int. Cl. B23b 29/034
U.S. Cl. 77—58         5 Claims

ABSTRACT OF THE DISCLOSURE

An apparatus for imparting radial displacements to an eccentrically rotatable tool includes a casing, a rotary member located within the casing and connected to the driving shaft of a machine tool, a tool carrying slide movable transversely to the axis of the driving shaft and a level gear ring keyed to the rotary member and driving a set of bevel pinions. The bevel pinions are rotatably mounted on pins carried by the casing and mesh with a double bevel gear ring. This double bevel gear ring meshes with another set of bevel pinions mounted on radial pins projecting from the inner wall of a worm wheel. There is also a second double bevel gear ring which meshes with the other set of bevel pinions. A bevel pinion which meshes with the second double bevel gear ring is keyed to a screw shaft which actuates the slide. A second screw shaft extends perpendicularly to the driving shaft and meshes with the worm wheel to provide a radial displacement of the slide. The invention is particularly characterized by the provision of a third screw shaft integral with a pinion meshing with a crown gear mounted upon the rotary member and driven by a torque limiting coupling. This third screw shaft meshes with the helical gear of a second worm wheel rotatably mounted on the second screw shaft. This second worm wheel meshes with a sleeve slidably mounted upon the second screw shaft. There is also a fourth screw shaft meshing with a third worm wheel which faces a second sleeve linked to the first-mentioned sleeve by a semi-cylindrical element. Due to this construction, the second screw shaft may be rotated at two different speeds by the rotary member. A control shaft carriers a finger used to provide a sliding movement of the semi-cylindrical element. A lever connected with the control shaft is used to rotate it into three different positions.

---

Mechanical devices for machine tools are known whereby a tool-holder which is connected to a driving shaft may be displaced radially with respect to the axis of said shaft, while rotating.

By the present invention remarkable improvements are provided to such devices, whereby the operation of a machine tool is greatly simplified and speedier than with the conventional machine tools.

It is an object of this invention to provide a means whereby the radial displacement of a tool-holder with respect to the driving shaft of the machine tool is achieved automatically and at different speeds by simply actuating a control lever.

It is another object of this invention to provide a mechanism whereby said radial movement of the tool-holder is rapidly and automatically reversed, by actuating a control lever.

It is a further object of this invention to provide a means whereby the feed motion of the tool-holder is automatically stopped at a predetermined position.

Additional objects and advantages of the invention will become apparent from the following description with reference to the attached drawings which illustrate a preferred embodiment thereof by way of a non-limitative example.

FIG. 1 is a diametral cross-section of the apparatus of this invention taken along line I—I of FIG. 2;

FIG. 2 is a cross-section of the same apparatus of FIG. 1, taken along line II—II of the same figure;

FIG. 3 is a diagrammatical elevation partially sectioned of the lower portion of the apparatus of FIG. 1; the detail for stopping the travel of the tool carrying slide is shown;

Figure 4:
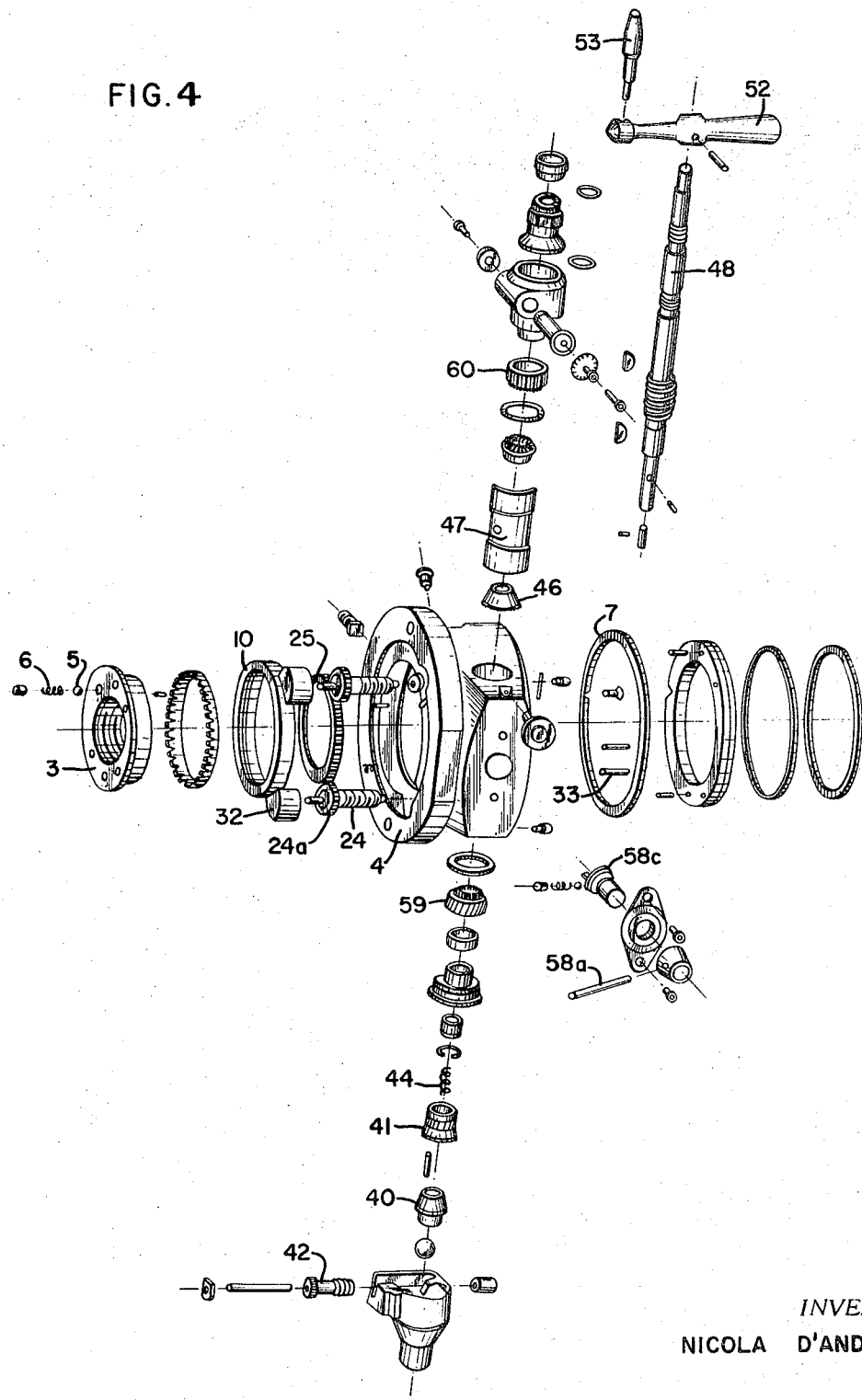
FIG. 4 is an exploded view of the stationary casing of the apparatus of this invention along with the component parts annexed thereto.
Figure 5:
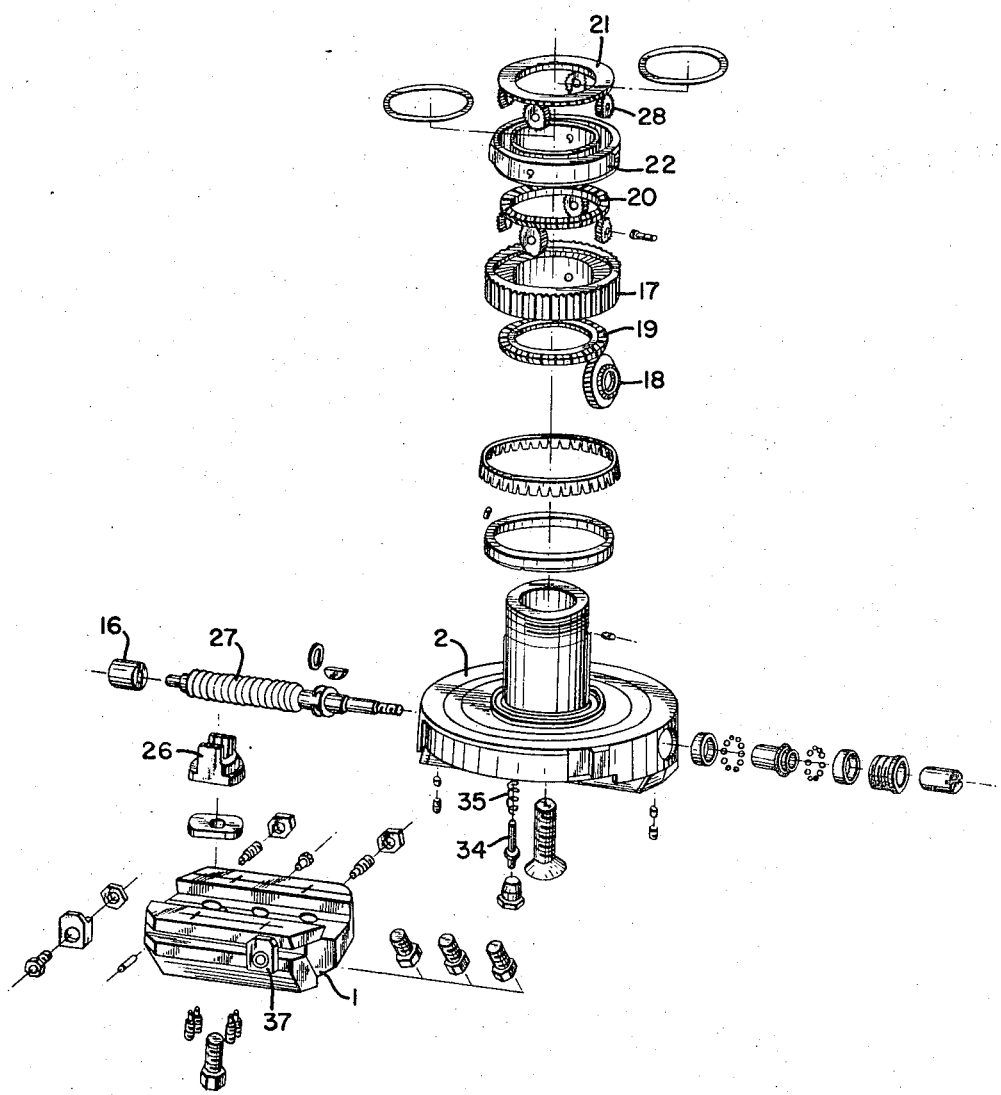
FIG. 5 shows an exploded view of the revolving member and the slide of the apparatus of this invention along with the component parts annexed thereto.
Figure 6:
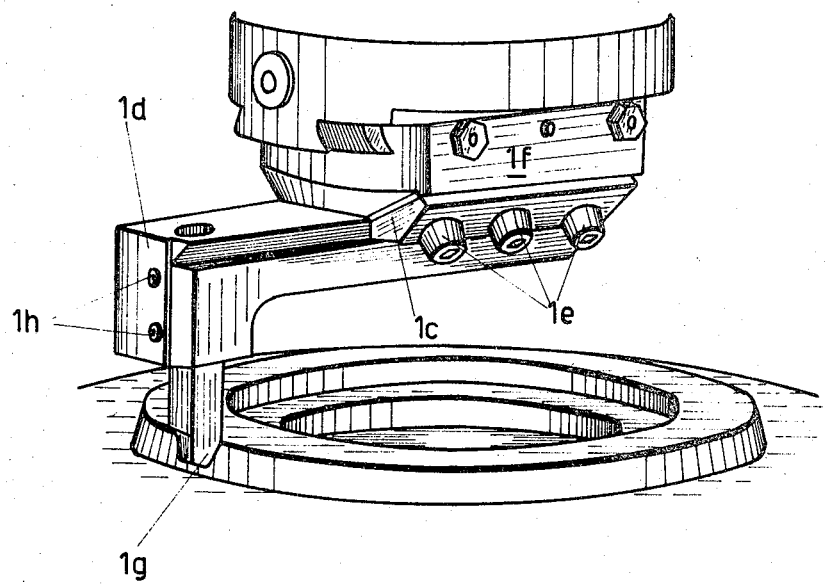

FIG. 6 is a perspective view of the lower part of the revolving member of the apparatus along with the tool mount on the slide thereof. The machine tool head of this invention comprises a casing 4 which, by suitable means not shown, is attached to the stationary structure of the machine tool; a revolving member 2 which is connected to the driving shaft (not shown) of the machine tool by means of an adapter which is formed with two truncated cones joining at their larger bases. The lower cone 4b fits into a corresponding conical recess of member 2, while the upper cone 4a fits into a corresponding recess (not shown) of the machine tool driving shaft. As a consequence, casing member 2 is rotated by the driving shaft when the machine tool is operating. A dovetail guide is provided on the bottom of member 2 for the slide 1 of the tool-holder. The latter is provided with a threaded projection 26 for engaging a screw shaft 27 which is rotated by a bevel gear 18 keyed thereon.

The revolving member 2 comprises a large toroid portion and a hollow cylindrical hub portion around which three ring bevel gears are disposed as follows starting from the free end of the said hub. A first ring bevel gear 21 keyed to the hub portion of member 2 drivingly engages a first set of planet pinions 28 rotatably mounted on pins 29a attached to casing 4 and which drivingly engage a second ring bevel gear 20 with double toothing. The latter drivingly engages a third ring bevel gear 19 with double toothing through a second set of planet pinions 28a, which are rotatably mounted on pins 29 attached to the inner wall of an annular helical gear or worm wheel 17. Bevel gear 18 which, as above indicated, is keyed on screw shaft 17, meshes with bevel gear 19 at the side thereof opposed to that which receives the motion from the train of gears 21, 28, 20, 28a.

Inside a boss 4e of casing 4 a bore is provided of which the axis is perpendicular to the axis of the driving shaft of the machine. Within this boss a screw shaft 48a is mounted which, by meshing with the worm wheel 17, drives the latter whereby the rotational speed of the third annular bevel gear 19 is slowed or speeded up with respect to the second annular bevel gear 20; as a consequence, bevel gear 28 will be rotated which is keyed on screw shaft 27 whereby a displacement in one direction or the other of slide 1 will be obtained. For rotating the screw shaft 48a, this is provided with a handwheel 53 which is keyed on the same shaft.

According to the present invention, the displacement of slide 1 can be obtained also automatically by means of the following arrangement.

On top of the first annular bevel gear 21 a ring nut 3 is threadingly mounted on the hub portion of member 2, which nut has a conical outer surface which is the inner race of a roller bearing, the outer race being formed on a ring 10, which is inserted in a recess of casing 4. Through ring nut 3 a plurality of regularly spaced holes are provided parallel to the machine driving shaft.

In each hole there is a ball 5 and a spring 6 which forces said ball towards the side of an annular gear 25 freely rotatably mounted on the hub portion of member 2. The side surface of gear 25 is provided with a plurality of cavities which have the form of spheric segments.

The number of balls 5 is the same as the cavities, so that, in normal conditions, each ball engage sa corresponding cavity. A torque can therefore be transmitted in these conditions from ring nut 3 to gear 25. However, if for driving gear 25 a torque is required greater than a predetermined value, which is produced by the force of spring 6, the balls will become disengaged from the corresponding cavities and will slide along the sides of gear 25. In this way a torque limiting device is provided for protecting gear 25 and the subsequent mechanical members from excessive stresses.

Gear 25 meshes with two pinions: a first pinion 24a is integral with the first screw shaft 24 (FIG. 2) with triple-start threading which is journalled at both ends in bushings which are inserted in casing 4; a second pinion which is keyed on a second screw shaft 23 with single-start threading. Screw shaft 24 meshes with a first ring gear 59 rotatably mounted on a screw shaft 48. Screw shaft 23 meshes with a second ring gear 60 rotatably mounted on screw shaft 48. On this shaft are also mounted two sleeves 46, 46a which are slidable along the shaft but are keyed to it for rotating therewith and are provided with a front serration or toothing. They are mounted at the two sides of the threaded portion 48a of screw shaft 48.

A sliding member 47 having the form of half a barrel is provided alongside screw shaft 48, of which barrel both end edges have an inwardly projecting rim for engaging each a circular groove of the outer surface of said sleeves 46, 46a. A pin 58c is mounted through a bore of boss 4e projecting from casing 4, which pin is perpendicular to screw shaft 48 and is provided with an eccentric finger which extends into a hole of sliding member 47. Pin 58c can be rotated by means of lever 58a from one to the other of three angular positions in which it is retained by means of a suitable device, such as a spring loaded ball which fits into one of three cavities of the outer cylindrical surface of pin 58c. Therefore, when pin 58c is rotated clockwise, sleeve 46a is driven to engage the front teeth of ring gear 60, while when pin 58c is rotated anticlockwise, sleeve 46 is driven to engage the front teeth of ring gear 59. As a consequence, depending on the position of lever 58a, the rotating movement of screw shaft 48 is obtained through the screw shaft 23 or through the screw shaft 24. In the first case, because the screw shaft 23 has a single-start threading, the rotating movement of screw shaft 48 is slower. In the second case, because the screw shaft 24 has a three start threading, screw shaft 48 is mover more rapidly. As shown by the drawings, the rotation of shaft 48 is in both cases the same. In a neutral position, that is when lever 58a is upright, neither of sleeves 46, 46a is engaged with the respective ring gear 59, 60 and in this case the screw shaft 48 may be rotated by means of handle 53.

In addition to meshing with ring gear 59, pinion 24a meshes also with a smaller pinion which is integral with a screw shaft 42. At the end of screw shaft 48 opposite to handlewheel 52 a clutch coupling is mounted consisting of a cylindrical extension 45 of shaft 48; of a cap 40 slidingly fitted on said extension 45 but keyed to it for rotating therewith, which cap has a conical outer surface for engaging the inner conical surface of a bushing 41 coaxial with shaft 48 and freely mounted thereon.

A helical gear 48a is provided on the outer surface of bushing 41 which gear meshes with said screw shaft 42. Cap 40 is driven to frictionally engage bushing 41 by means of a lever 55 which moves a piston 54 towards the end of screw shaft 48.

A spring 44 is inserted between the extension 45, in a cup like axial recession of it, and the inner side of the bottom of cap 40 for maintaining the latter disengaged from bushing 41 except when cap 40 is moved by means of lever 55 against the force of spring 44.

Because pinion 42 rotates in a direction contrary to that of pinion 24a the above described clutch coupling provides a means for reversing the rotation of screw shaft 48 with respect to that imparted by pinions 24a or 23.

On slide 1, along one side thereof, a longitudinal groove is provided with T cross-section, along which the head of a bolt is slidably engaged, which bolt extends through a block 37 and is provided with a nut for tightening said block in any position along the groove. A cam is provided on block 37 which cam is so positioned that it engages the end of a rod 34 when slide 1 has reached a predetermined position of its travel. Rod 34 extends through said toroid portion of member 2 and, when not engaged by the cam of block 37, it terminates at little distance from an annular spring 7 located in a circular groove of casing 4.

Referring particularly to FIG. 1, spring 7 is attached to casing 4 by means of screw 7', while at a diametrally opposed position, it elastically sustains two parallel plungers 33 of which the ends opposite to spring 7 abut against a diametral step of a control shaft 58c. When lever 58a is in its upright position, the ends of plungers 33 are at the same level, and the whole circumference of spring 7 lies in a plane. But if lever 58a is turned left or right, the diametral step of pin 58c will force one of plungers 33 against spring 7 and depresses it. And because spring 7 is attached to casing 4 by means of screw 7', the spring will be deflected downwards.

When so deflected, spring 7 will not usually contact the upper end of rod 34. However, when the latter will engage the cam of block 37, its end opposite to that engaged by the cam will reach the same level as the lower face of spring 7 when not deflected. In these conditions, the upper end of rod 34 will slide along said lower face of spring 7 during the rotation of member 2 and flattens spring 7 against the bottom of the corresponding groove of casing 4. As a consequence, plungers 33 will be pushed upwards and lever 58 will be restored to its neutral position and the automatic actuation of slide 1 will be stopped.

Referring now to FIGS. 3 and 6, slide 1 is provided at its face opposite to that engaging member 2, with a channel 1a for clamping a tool adapter therein. One of the side ribs 1c which define the dovetail channel, as shown in FIGS. 3 and 6, can be forced against the corresponding side of the tool adapter 1d by means of a set of screws 1e. This is obtained because two longitudinal grooves are provided along the base of rib 1c. One groove is along the corner where the outer surface of rib 1c joins the outer surface of the slide body, a second and much deeper groove is provided along the corner where the inner surface of the rib joins the bottom of channel 1a.

The cross section of this groove extends into the body of slide 1 for a depth parallel to the outer surface of rib 1c. The set of screws 1e perpendicular to this surface and to the groove forces rib 1c against the adapter 1d like a jaw taking advantage of the flexibility obtained by said grooves in the region where said rib joins the body of slide 1. In this way, the adapter 1d can be clamped in any position along channel 1a of slide 1.

The tool 1g is carried a tone end of the adapter in a hole perpendicular to the adapter wherein the tang of the tool is inserted and firmly tightened by means of screws 1h. Thanks to the adapter 1d the tool can be mounted with an initial offset with respect to the centerline of the driving shaft of the machine. The above described tool mounting provides a very rigid connection of the tool to the slide 1, such that any vibration of the tool cutting edge is prevented.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In an apparatus for imparting radial displacements to an excentrically rotatable tool, which apparatus comprises a rotating member connected to the final drive shaft of a machine tool within a stationary casing attached to the frame of the machine and coaxial with said member; a tool carrying slide being slidably connected to said member for transverse movement with respect to the axis of said driving shaft; a single bevel gear ring surrounding said member and keyed to it for driving a first set of bevel pinions rotatably mounted on pins attached to said casing and meshing with one side toothing of a first double bevel gear ring rotatably mounted on said hub of which gear ring the other side toothing meshes with a second set of bevel pinions mounted on radial pins projecting from the inner wall of a first worm wheel with helical gear on its outer surface; a second double bevel gear ring meshing with said second set of pinions at one side and with a bevel pinion at the other side, which pinion is keyed on a first screw shaft of which the threading engages a corresponding threading on an element attached to said slide; a second screw shaft being journalled in a bore of said housing perpendicular to said driving shaft and offset from the axis thereof; the threading of said second screw shaft engaging said first worm gear whereby a radial displacement of said slide is obtained by rotating said second screw shaft; the improvement comprising a third screw shaft parallel to the drive shaft and integral with a straight pinion meshing with a crown gear freely mounted on the hub portion of said rotating member and driven by it through a torque limiting coupling; the threaded portion of which third screw shaft permanently engages the helical gear of a second worm wheel rotatably mounted on said second screw shaft, said second worm wheel being provided with a front toothing for engaging a corresponding toothing of a first sleeve slidable on said second screw shaft and keyed to it at one side of the threaded portion thereof; a fourth screw shaft similar to the third screw shaft but with a threading of different start which screw shaft meshes with a third worm wheel similar to the second worm wheel but disposed at the other side of the threaded portion of said second screw shaft with its front toothing opposed to that of the second worm wheel and facing the front toothing of a second sleeve similar to the first one; said sleeves being linked to one another by a semicylindrical element coaxial with said second screw shaft whereby the latter may be driven to rotate alternately at two different speeds by said rotating member through the third or fourth of said screw shafts depending on the position of said semicylindrical element along said second screw shaft, the sliding movement of said element being achieved by means of a control shaft journalled into a boring of said stationary casing, of which shaft the axis is perpendicular to said second screw shaft and to the machine shaft and which is provided at its end projecting from said casing with a control lever and at its other end with an actuating eccentric finger for engaging an aperture of said semicylindrical element; said control shaft being rotatable by means of said lever in three discrete positions wherein it is retained by a spring and ball detent one position corresponding to the engagement of either one of said sleeves with the corresponding worm gear and the third position corresponding to a neutral condition wherein said second screw shaft may be rotated by a handwheel keyed onto the same shaft.

2. An apparatus as per claim 1 wherein said torque limiting coupling comprises a ring keyed onto the hub portion of said rotating member which ring has a circumferential row of regularly spaced bores parallel to the machine drive shaft, a helical spring being contained in each of said bores which spring forces with one end a ball in a spherical cavity on one side of said crown gear and is retained at the other end by a threaded plug whereby the torque transmissible to said crown gear is limited to the value at which said balls are moved against the force of the corresponding springs and come out of the corresponding spherical cavities.

3. In an apparatus as per claim 1, a rapid reversal device of the radially displacing movement comprising a fifth screw shaft parallel to the machine drive shaft and integral with a straight pinion which meshes with the pinion of said third screw shaft; the threaded portion of said fifth screw shaft being permanently engaged with a helical gear provided on the outer surface of a bushing coaxial to said second screw shaft and rotatably mounted about one end thereof; which bushing may be coupled for rotation to said second screw shaft by means of a friction clutch comprising a cap slidably mounted within a housing attached to said casing and also slidable along the end of said second screw shaft but keyed thereon, which cap has a conical outer surface that engages a corresponding conical inner surface of said bushing whenever said cap is forced through an interposed piston towards said bushing against the force of a helical spring by means of a lever pivotally mounted on a fork projecting from said housing; said spring being inserted between the inner bottom of said cap and the end of said second screw shaft, whereby, after stopping the radial feeding displacement of the total carrying slide, this may be moved at a speed greater than that imparted by said fourth and fifth screw shafts in the reverse direction, the rate of the reversal movement depending on the ratio between the diameters of the pinions of said third and fifth screw shafts.

4. An apparatus as per claim 1 wherein the automatic displacement of the tool carrying slide through said fourth and fifth screw shaft may be stopped at a predetermined position of its travel by means of a device comprising an annual spring seated in a circular groove of said stationary casing in a plane perpendicular to the machine drive shaft which spring supports two plungers which at one end abut against a diametrical step of said control shaft and at the other end abut against the side of said spring adjacent to the bottom of said groove, a screw which connects said spring with the bottom of said groove at a position diametrally opposed to said plungers; a rod in a through boring of said rotating member of which rod one end, during the rotation of said member, describes a circular path at a small distance from the side of said spring opposite to said plungers except when a cam attached to said slide at an adjustable position on the radial displacement of the latter engages the other end of said rod and drives the latter into sliding engagement with said spring whereby this is flattened against the bottom of said groove and, if one of said two plungers had previously been depressed by the diametral step of said control shaft and consequently said spring had been deflected out of its plane, the same plunger is driven by said rod through the interposed spring to force against said step and restore said control shaft to its neutral position.

5. An apparatus as per claim 1, wherein said slide at its face opposite to that engaging said rotating member is provided with a channel with dovetail cross-section one of the longitudinal sides of said channel being formed as a jaw member integral with said slide, which member can be flexibly forced against the side of a tool carrying adapter slidably fitted into said channel for locking it in different positions along the channel; two grooves being provided along said jaw member for imparting flexibility thereto: a shallow one along the corner defined by the outer surfaces of said member and said slide and a much deeper one at the corresponding inner corner; a set of screws being provided which connect said jaw member and the slide body across said deeper groove whereby said jaw is forced against the adapter to lock it in a position along said channel; said adapter being provided at one end thereof with a bore parallel to the machine drive shaft in which bore the tang of a tool may be clamped by means of locking screws; whereby said tool can be mounted on said slide with an initial eccentricity.

References Cited

UNITED STATES PATENTS

| | | | |
|---|---|---|---|
| 3,283,619 | 11/1966 | Marchis | 77—58 |
| 3,344,693 | 10/1967 | Scholl | 77—58 |

GERALD A. DOST, Primary Examiner